United States Patent [19]

Deslandres

[11] Patent Number: 5,423,127
[45] Date of Patent: Jun. 13, 1995

[54] HEADLAMP HAVING IMPROVED LOCATING MEANS FOR THE TEMPORARY FRONTAL FITTING OF A BEAM ADJUSTING APPARATUS

[75] Inventor: Antoine Deslandres, Boissy-Saint Leger, France

[73] Assignee: Valeo Vision, Bobigny Cedex, France

[21] Appl. No.: 128,898

[22] Filed: Sep. 29, 1993

[30] Foreign Application Priority Data

Oct. 1, 1992 [FR] France .................. 92 12101

[51] Int. Cl.⁶ .............. B60Q 1/06; G01B 5/25
[52] U.S. Cl. .......................... 33/288; 362/61
[58] Field of Search .......... 33/288, 263, 264, 275 R, 33/533, 600, 645; 362/61

[56] References Cited

U.S. PATENT DOCUMENTS 4,731,706 3/1988 Ricard ................... 362/61

FOREIGN PATENT DOCUMENTS 2171797 9/1986 United Kingdom .

Primary Examiner—Christopher W. Fulton
Attorney, Agent, or Firm—Morgan & Finnegan

[57] ABSTRACT

A motor vehicle headlamp has a device for generating a headlamp beam, together with a cover glass. A series of projecting elements is provided in the vicinity of the cover glass for location of a beam adjusting apparatus. At least one of these projecting elements is constituted by a portion of a movable member which is displaceable between a first or retracted position and a second position, in which this portion of the movable member occupies a predetermined locating position with respect to the cover glass.

11 Claims, 1 Drawing Sheet

HEADLAMP HAVING IMPROVED LOCATING MEANS FOR THE TEMPORARY FRONTAL FITTING OF A BEAM ADJUSTING APPARATUS

FIELD OF THE INVENTION

The present invention relates in general terms to the adjustment of the orientation of the light beams emitted by motor vehicle headlamps.

BACKGROUND OF THE INVENTION

In some countries, and particularly in the United States of America, it is usual at the present time to carry out headlamp beam adjustment using an apparatus which is fitted in a well-defined position with respect to the headlamp, by applying three reference points of the apparatus against three homologous reference bosses or projecting elements which are provided on the external surface of the cover glass of the headlamp, and which are integral with it. The positions of these three bosses are clearly defined and themselves define a plane of reference which may for example be vertical, or which may have predetermined inclination with respect to the vertical plane. For more details of this method of adjusting a headlamp beam, reference is made to the current United States standard FMVSS108.

One major difficulty in the manufacture of cover glasses which have to be provided with such bosses is encountered in the case of headlamps with inclined cover glasses. The inclination of the glass may be required, especially for aerodynamic or styling reasons, and the inclination may be such that the normal vector is directed upwardly (in the case where the cover glass forms a forward extension of a hood having a relatively forwardly plunging profile), and/or in which the normal vector is directed towards the side (in the case where the cover glass is in a rounded corner region of the vehicle).

Reference is here made to FIG. 1 of the accompanying drawings, which shows in vertical axial cross section an inclined cover glass G which is formed with conventional bosses, or projecting elements, B1 and B2. Because of the inclination of the cover glass, it can be seen that the upper boss B1, in order to define with the boss B2 (and with a third boss not shown) a vertical reference plane PV, must project forward from the general plane of the cover glass by a considerable amount. Such a boss is firstly ugly in appearance, and secondly dangerous, especially in the event of collision between the vehicle and a pedestrian. In addition, such a projecting boss can prove to be rather fragile.

Another disadvantage of the prior art technique lies in the fact that the three standardised bosses, which must by nature be included in the general contour of the glass are spaced apart from each other by quite large amounts. It is therefore not possible to make headlamps in which the cover glass is smaller than the limiting size that enables the three bosses to be circumscribed.

DISCUSSION OF THE INVENTION

An object of the present invention is to overcome the above mentioned disadvantages of the prior art.

According to the invention, therefore, a motor vehicle headlamp, of the type comprising means for generating a light beam, together with a cover glass, with a series of bosses or projecting (male) elements being provided in the region of the cover glass for location of a beam regulating apparatus, is characterised in that at least one of the bosses is constituted by part of a movable member which is displaceable between a first or retracted position and a second position in which the said portion occupies a predetermined locating position.

In a first embodiment, the said portion of the movable member engages, in the said second position of the movable member, on a positioning pip formed on the cover glass and projecting from the latter by only a very small amount.

In a second embodiment of the invention, the said portion of the movable member adopts a position, in the said second position of the movable member, in which its said portion lies on the outside of the front contour of the cover glass.

Further aspects, objects and advantages of the present invention will appear more clearly on a reading of the detailed description which follows, in which two embodiments of the invention are described by way of example only and with reference to the accompanying drawings.

DESCRIPTION OF PREFERRED EMBODIMENTS OF THE INVENTION

Figure 1:
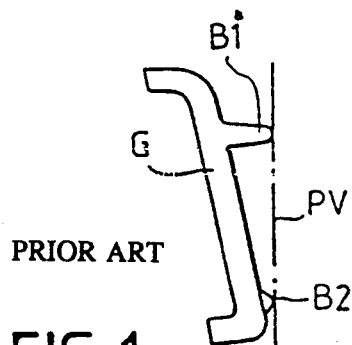
FIG. 1, as described above, shows the present state of the art in axial vertical cross section.
Figure 2:
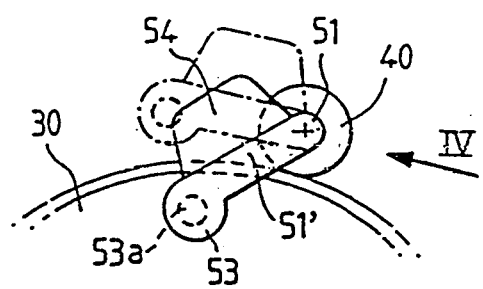
FIG. 2 is a diagrammatic front view showing part of a headlamp made in accordance with the present invention.
Figure 3:
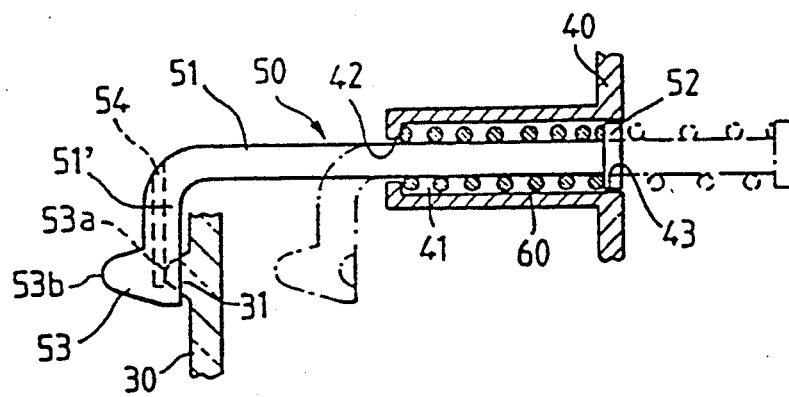
FIG. 3 is a view taken in the direction of the arrow III in FIG. 2, shown partly in cross section.
Figure 4:
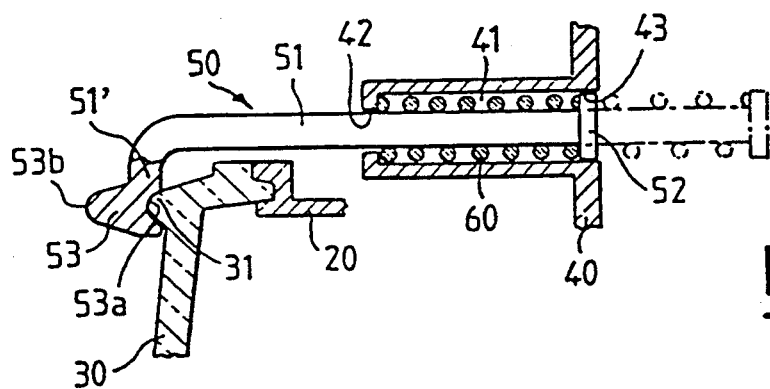
FIG. 4 is a view in the direction of the arrow IV in FIG. 2, again shown partially in cross section.

Reference will first be made to FIGS. 2 to 4, in which a headlamp is shown, partially and diagrammatically, which includes a light source (not shown), a reflector 20 and a front glass 30. In this example the front glass 30 has a generally circular contour.

A back plate 40 is mounted on the vehicle to which it is fixed, for example on the housing of the headlamp; or, in the case of a sealed headlamp of the kind not having a housing, it is mounted on the component which defines the reflector 20. This back plate 40 defines a generally cylindrical housing 41 which is open towards the front (i.e. towards the left in FIGS. 3 and 4) through a circular aperture 42 having a diameter smaller than that of the housing 41 itself. The latter is open at the rear through another circular aperture 43, which is in practice an extension of the housing 41 and is of the same diameter as the latter.

A movable element, or movable member, 50 comprises a rod 51, having a diameter which is equal to, or slightly smaller than, that of the aperture 42. At its posterior end the rod 51 carries a collar 52 having an external diameter which is equal to, or slightly greater than, the common diameter of the housing 41 and aperture 43.

A helical compression spring 60 is fitted in the annular space which is defined between the rod 51 and the wall of the housing 41. The spring 60 bears at one end on the collar 52, and at its other end on the base plate 40 in the part of the latter which surrounds the aperture 42.

The rod 51 has a portion 51' at the opposite end of the rod from the collar 52. The portion 51' is bent through about 90° from the main portion of the rod 51 which is fitted through the base plate 40. The bent portion 51' carries at its free end an element 53, the purpose of which is to serve as a removable boss or projecting element on the front of the cover glass 30. To this end, the element 53 has a recess 53a on its rearwardly facing surface (i.e. the right hand surface of the element 53 in FIGS. 3 and 4). The shape of the recess 53a is substantially complementary to that of a very slightly projecting pip 31 formed on the cover glass 30 itself. In its forwardly facing region, the element 53 has a generally convex contour indicated at 53b, the outermost portion of which is arranged to act as a bearing region for a beam adjusting apparatus (not shown), which may be of any suitable conventional type.

It will also be noticed that a manoeuvring tongue 54 is provided along the bent portion 51' of the rod 51. This tongue 54 is essentially flat and is oriented generally upwardly.

The purpose of the spring 60 is to exert a permanent force on the movable member 50 so as to bias the latter towards the rear. It will also be noted that the rod 51 of the member 50 is freely rotatable in the housing 41 in the back plate, and that it can also slide in the latter within certain limits, with a variation which corresponds to the compression of the spring 60.

The movable member, or element, 50 is capable of being displaced manually between two positions. The first of these positions, which is a retracted position, is indicated in FIG. 3 in phantom lines. In this position the portion 53 that defines the boss is retracted, that is to say it lies behind the plane of the front face of the cover glass 30. The the latter is now exposed, but since it only projects a little way, its presence is in no way inconvenient.

The second position of the movable element 50 is indicated in full lines in FIGS. 2 to 4. The operator puts the element 50 into this position by exerting firstly a pulling force (towards the left in FIGS. 3 and 4), optionally by means of the tongue 54, so as to bring the portion 51', 53 of the element 50 into a position in which it projects forward from the front plane of the cover glass. This is achieved by overcoming the return force exerted by the spring 60. The operator subsequently causes the element 50 to pivot about the axis which is defined by its rod 51, until the recess in the element 53 is in register with the positioning pip 31 of the cover glass. The operator then releases the element 50, and the return spring exerted by the spring 60 has the effect of engaging the recess 53a of the element 53 on the pip 31 of the cover glass. This second position of the element 50 is indicated in full lines in the Figures.

The element 53 is thus put into a working or reference position, and its projecting portion 53b acts as a male locating member for positioning a headlamp beam orienting apparatus. Thus it can be seen that the disengageable element 53 forms a kind of retractable spacer.

When adjustment of the headlamp has been carried out, the adjusting apparatus is withdrawn, and the spacer 53 can once again be retracted by carrying out a procedure which is the reverse of that described above. Thus, so long as no adjustment is to be carried out, the cover glass 30 retains a normal appearance, and is in no risk of any danger in the event of a mechanical shock, for example when hitting a pedestrian. The spacer 53 is hardly perceptible from the outside of the vehicle, and is protected.

Figure 5:
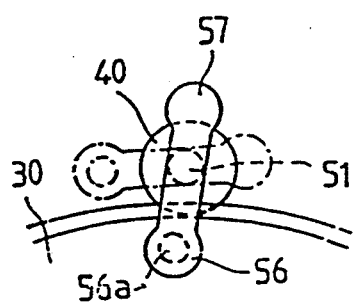
FIG. 5 is a front view similar to FIG. 2, showing another embodiment of the invention.
Figure 6:
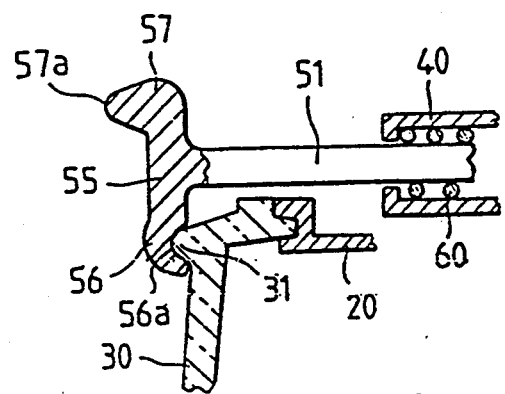
FIG. 6 is a view similar to FIG. 4 for the same embodiment as is shown in FIG. 5.

FIGS. 5 and 6 show another embodiment of the invention. Those elements in FIGS. 5 and 6 which are identical or similar to those in FIGS. 2 to 4 are indicated as far as possible by the same reference numerals, and will not be described again.

In this embodiment the end of the rod 51 opposite to the collar 52 includes a cross piece 55. This cross piece includes at one end a locating portion 56, which includes, on an internal face directed towards the cover glass 30, a recess 56a which is arranged to cooperate with the pip 41 formed on the cover glass 30, with a view to positioning. A portion 57 at the other end of the cross piece 55 has a dome-shaped element 57a on its outer side. The apex or outer portion of the dome-shaped element 57a acts as a male projecting element for location of a standard headlamp beam adjusting apparatus.

In the first or retracted position of the movable member or element 50 (indicated in phantom lines in FIG. 5), the assembly comprising the cross piece 55 and its terminal portions 56 and 57 lies in retracted relationship with respect to the cover glass 30, with the cross piece 55 extending approximately parallel to the adjacent edge of the cover glass as shown in FIG. 5.

In the second or working position of the movable element 50, the recess 56a of the locating portion 56 is in engagement with the pip 31 of the cover glass. The cross piece 55 thus adopts a clearly defined orientation in which it is substantially inclined with respect to the adjacent edge of the cover glass. The portion 57 which defines a boss then also occupies a well-defined position, and a beam adjusting apparatus can be fitted on this boss and on both of the others so as to carry out the adjustment.

One particular advantage given by this type of embodiment lies in the fact that it enables at least one projecting element to be formed on the outside of the front contour of the cover glass. Then, if desired, it is possible to make a headlamp cover glass of very much reduced dimensions, the shape and dimensions of the terminal portion 55, 56, 57 of the movable element 50 being adapted to suit the particular application.

A headlamp could of course be equipped with one or more retractable projecting elements or bosses, in one or other of the embodiments described above. In this connection, it will be noted that the movable element or elements are preferably mounted in the factory on the headlamp itself, in well defined positions. In a modification, the movable member or members may be brought temporarily to the vicinity of the headlamp when headlamp adjustment is to be carried out.

In addition, the present invention is in no way limited to the embodiments described above: the person skilled in the technical field to which this invention relates will know how to apply to it any variant or modification in accordance with its spirit.

What is claim is:

1. A motor vehicle headlamp comprising light beam generating means and a cover glass associated therewith, and means associated with the cover glass and defining a series of projecting elements for location of a beam adjusting apparatus with respect thereto, wherein the headlamp further includes a movable member, and means mounting the movable member for movement of the latter between a first, retracted, position and a second position, the said movable member having a portion defining at least one said projecting element for occupying a predetermined locating position with respect to the said cover glass when the movable member is in its said second position.

2. A headlamp according to claim 1, wherein the said movable member and the cover glass together define complementary means for putting the said portion defining the said projecting element into said predetermined position.

3. A headlamp according to claim 2, wherein the said complementary means are provided in a posterior region of the said portion of the movable member, with the said projecting element extending into a front contour of the cover glass.

4. A headlamp according to claim 2, wherein the said portion of the movable member lies on the outside of a front contour of the cover glass, the said complementary means being arranged in a region which is offset laterally from the said portion of the movable member.

5. A headlamp according to claim 1, wherein the said movable member comprises a rod, the headlamp further including guide means mounting the said rod for sliding and rotating movement of the latter, the rod having an axis which defines the direction of retraction of the movable member.

6. A headlamp according to claim 3, wherein the said movable member comprises a rod, the headlamp further including guide means mounting the said rod for sliding and rotating movement of the latter, the rod having an axis which defines the direction of retraction of the movable member, and wherein the said rod has a bent terminal portion defining a free end which itself carries the said portion defining the projecting element.

7. A headlamp according to claim 4, wherein the said movable member comprises a rod, the headlamp further including guide means mounting the said rod for sliding and rotating movement of the latter, the rod having an axis which defines the direction of retraction of the movable member, and wherein the said rod has a terminal region defining a cross piece having a first free end and a second free end, the cover glass having first engagement means and a second engagement means being carried by the said first free end of the said cross piece for cooperation with the said first engagement means, the said portion defining the projecting element being carried by the said second free end.

8. A headlamp according to claim 7, wherein the said cross piece is arranged so that in the said retracted position of the movable member, the cross piece extends substantially parallel to an adjacent edge of the cover glass.

9. A headlamp according to claim 5, wherein the said rod defines a terminal region at the end thereof opposite the portion of the movable member defining the said projecting element, and further includes a collar carried on the said terminal region, the said guide means comprising a cylindrical housing, having a first side and a wall closing the first side and defining an aperture through which the rod extends, and a second side defined by the said collar, the rod and the said housing together defining an annular space within the latter, the headlamp further including a return spring disposed in the said annular space and bearing at one end on the said wall and at the other end on the said collar.

10. A headlamp according to claim 1, wherein the cover glass is inclined, the headlamp having a said movable member at least in a region of the cover glass which is behind other regions of the said glass.

11. A headlamp according to claim 1, wherein the cover glass defines a general contour which avoids circumscribing a group of three normalised projecting element positions, and further including said movable member at least in a region of the cover glass in which a said projecting element must lie outside the said contour.

* * * * *